Nov. 3, 1931.  J. W. COSGROVE  1,830,593
MOUNTING DEVICE
Filed Oct. 2, 1924
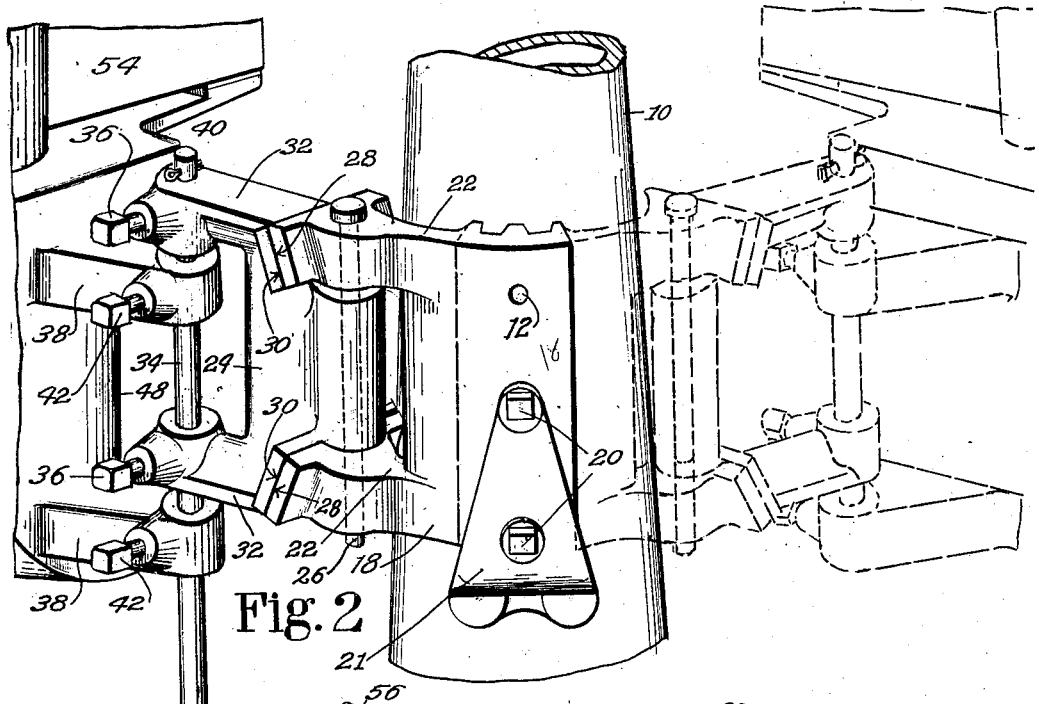
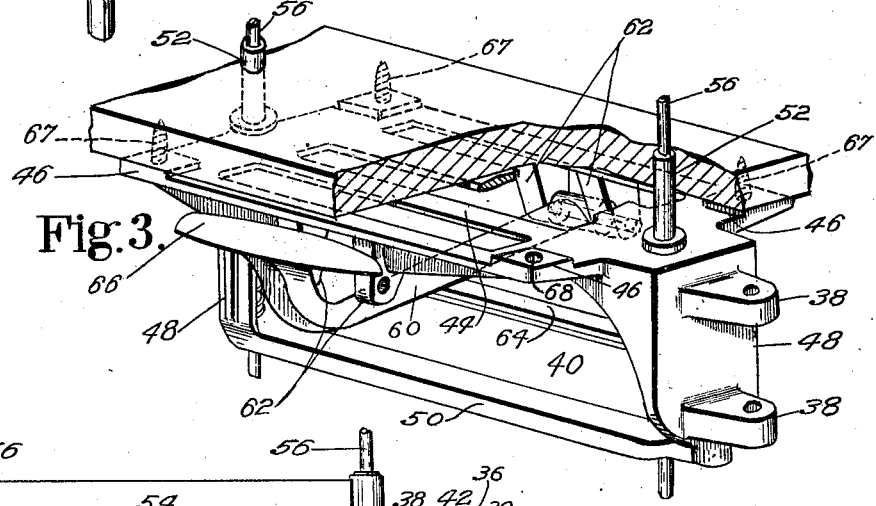
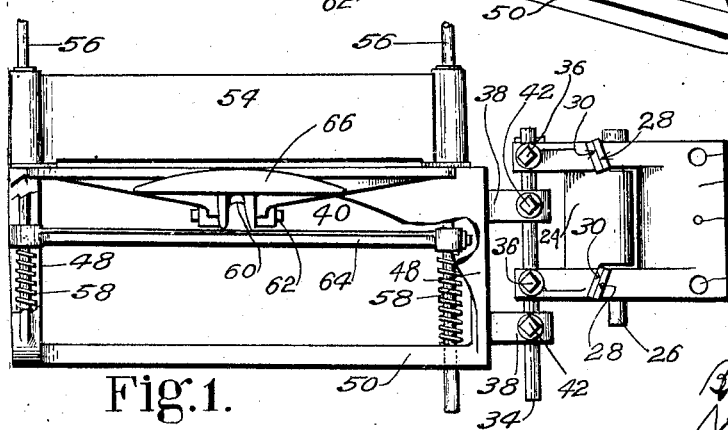
INVENTOR
John W. Cosgrove
By his Attorney,
Nelson N. Howard Patented Nov. 3, 1931

1,830,593

UNITED STATES PATENT OFFICE

JOHN W. COSGROVE, OF MEDFORD, MASSACHUSETTS, ASSIGNOR TO UNITED SHOE MACHINERY CORPORATION, OF PATERSON, NEW JERSEY, A CORPORATION OF NEW JERSEY

MOUNTING DEVICE

Application filed October 2, 1924. Serial No. 741,203.

My invention relates to devices for mounting apparatus in various positions convenient for use by operators, it being of especial utility in connection with pasting apparatus which it may be desired to support in different operating relations.

A pasting apparatus, as that for applying adhesive to the counters of shoes, is sometimes supported upon a bench, but is frequently more convenient for the operator if mounted directly upon a machine in which the coated counters are used, as an assembling machine. An object of the invention is to provide a device by which such mounting may be made effectively in any one of a plurality of desired positions, in each of which the apparatus will be securely held and yet be readily removable. This object is attained by the use of a bracket, which may be attached to a machine frame, an extension readily separable from but positively held against movement upon the bracket, and a support upon which the pasting or other apparatus may be mounted. The connection of the extension to the bracket may be through alined openings in both these elements, which openings receive a securing spindle, while opposed contact-faces upon the bracket and extension prevent movement of the latter element after the spindle has been inserted. The support is preferably arranged for adjustment upon the extension, so that its position may be made most convenient for the operator, at which point it may be secured in place.

A single embodiment of the invention is illustrated in the accompanying drawings, where Fig. 1 shows my improved mounting device arranged for attachment to a machine column and carrying a paste-pan;

Fig. 2 is a perspective view of the portions of the device most closely associated with the column and attached thereto, its reverse position appearing in dotted lines; and Fig. 3 shows, in front elevation, the support and pan associated with a bench.

Referring particularly to Figs. 1 and 2, a column 10, which may be a part of the frame of an assembling machine, is provided at its side with two threaded openings, situated one above the other, and with which may be respectively alined two of a series of three openings 12, 14 and 16 formed in the securing plate of a bracket 18. This bracket has a ribbed inner surface (Fig. 2). The central opening 14 is of such diameter as to permit a securing screw 20 to pass freely through it but substantially to fill it. The upper and lower openings are made larger than the corresponding screw 20, so that the bracket may be adjusted about the screw in the center opening 14, to bring the supported parts into the correct horizontal relation. It is then fixed in place by tightening screws 20 in the next lower opening as it hangs on the upper screw, thereby to cause the ribs to bind upon the column. In Fig. 2, there appears, associated with the bracket beneath the heads of the screws, a plate 21, which has no direct connection with the present invention, it serving as an abutment for a compression spring of the assembling machine. By placing the opening 14 over the upper column-opening, and either the opening 12 or the opening 16 in registration with the lower column-opening, the bracket 18 may be caused to extend either to the right or the left of the column 10, as may be preferred by the operator, and fixed by the screws 20. From the securing plate of the bracket extend horizontal arms 22, 22, at the outer extremities of which are vertically alined openings. Entering the space between the arms is the inner end of an extension-arm 24, in which is a vertical opening for alinement with those of the bracket. The extension is secured in place by a headed spindle 26 passing through all these vertical openings. When the elements are thus assembled, there come into contact pairs of opposite faces 28 and 30, formed respectively upon the bracket-arms and extension-arm, and lying upon both sides of the spindle. These faces are shown as so inclined that the two pairs converge inwardly, and, when drawn together by the insertion of the spindle in the openings, hold the extension firmly against movement, both about the spindle as an axis and also vertically thereon. The extension becomes, in effect, an immovable portion of the bracket. Nevertheless, separation of the extension-arm or its restoration to position are permitted simply by the removal or insertion of the spindle 26. The contact-faces 28 and 30 are symmetrically placed upon the bracket and extension, so their effect is the same, regardless of whether the bracket projects to the right or left of the column. The extension-arm is divided to form portions 32, and at the outer ends of these divided portions are vertical openings, to receive a spindle 34 fixed in place in the extension by set-screws 36, 36 threaded through the sides of the divided portions.

Arranged to turn about the spindle 34 are the separated arms 38, 38 of a support 40. The support may be located at different heights along the spindle and at different angles about it, to suit the needs of the operator of the machine, and fixed in place by set-screws 42 threaded into the arms 38. The support is shown as including a rectangular top-plate 44 having openings to lighten the structure, and provided at each of its corners with a slightly elevated contact-lug 46. From the central portions of the opposite extremities of the support depend side bars 48, 48, one of which carries, formed integrally upon it, the arms 38. A cross-bar 50, connecting the lower extremities of the bars 48, strengthens the support and serves as an abutment for operating elements of the apparatus it carries, as will later appear. Rising from the extremities of the top-plate, above the bars 48, are tubular projections 52, 52. When a paste-pan, as is illustrated at 54, is to be mounted upon the support, these projections enter vertical openings in it, locating it exactly with relation to the support and to actuating elements for the pasting apparatus, which may be carried thereby. These projections also receive, through vertical bores, reciprocatory rods 56, 56, upon which the grid of the pasting apparatus may be supported and actuated. This grid is not herein illustrated. Springs 58, 58 (Fig. 1) surround the rods, being interposed between a bar 64 fixed to said rods and the bar 50. The bars 64 and 50 are engaged by the upper and lower ends of the springs, respectively. These springs serve to maintain the grid normally raised out of the paste within the pan. To lower the grid for the purpose of effecting its immersion in the paste, the support is provided with a lever 60 which may be pivoted upon either of two pairs of lugs 62, 62. These lugs are formed at opposite sides of the under surface of the top-plate, one pair or the other being employed as bearings for the lever 60, depending upon which side of the machine column the support is mounted while the other lugs serve as guides for the lever to prevent its lateral deflection. The lever 60 bears upon the bar 64, and, when lowered, as by pressure upon a finger-piece or pad 66, draws down the rods to carry the grid into the pan.

If the support is to be mounted upon the bracket, the pan preferably rests directly upon the top-plate, as appears in Fig. 1. If it is desired to mount the paster upon a bench (Fig. 3) the support is secured to the under side of said bench by screws 67 extending through openings 68 in the lugs 46. The projections 52 then pass through holes bored in the bench, and are of sufficient length to extend above its upper surface to enter the openings in the pan 54, and thus correctly locate it with respect to the grid supported upon the rods 56.

From what has been hereinbefore stated, it will be seen that my improved device is organized to support a pasting or other apparatus either upon a machine-frame or upon a bench. In the first instance, it is only necessary to attach the bracket 18 by two screws, and insert the spindle 26 through the openings in the bracket and extension. When thus mounted, the extension is securely held against movement upon the bracket, both laterally and vertically, but may be removed with the support and pasting apparatus as a unit by simply withdrawing the spindle. The support is maintained at a convenient distance from the column by this mounting, and is adjustable to the best operating position by means of the screws 42. Separation of the extension with the support and pasting apparatus, reversal of the bracket and the reassembling of the extension with the associated elements locate the apparatus at the opposite side of the machine. The support employed alone, without change, serves to mount the pasting apparatus upon a bench by the insertion of four screws, all the actuating elements of the apparatus being carried with the support undisturbed. The novel features embodied in the support for a pasting apparatus, for example, which are herein disclosed, are not claimed herein, however, since they form the subject-matter of a divisional application Serial No. 519,773, filed March 3, 1931.

Having described my invention, what I claim as new and desire to secure by Letters Patent of the United States is:

1. A mounting device comprising a bracket, an extension therefrom, said bracket and extension having opposed faces converging toward a horizontal axis and contacting to prevent vertical movement of the extension upon the bracket, a separable connecting member engaging the bracket and extension to maintain contact of the faces and hold the extension on the bracket, and a support mounted upon the extension.

2. A mounting device comprising a bracket having oppositely inclined faces, an extension provided with faces similarly inclined in opposite directions for contact with those of the bracket, there being in the bracket and extension openings alined only when the faces are in contact, a connecting member passing through and closely fitting the openings, and a support mounted upon the extension.

3. A mounting device comprising a bracket having inclined faces converging inwardly and a recess between said faces, an extension provided with a projection having faces inclined reversely with respect to the faces of the bracket, said projection being arranged to enter the recess between those of the bracket to bring its faces into contact with those of the bracket, there being openings in the bracket and in the projection on the extension alined when the faces are in contact, a spindle passing through the openings separably to maintain the extension upon the bracket, and a support mounted to swing upon the extension.

4. A mounting device comprising a bracket having vertically spaced arms, an extension provided with a projecting portion entering between the arms, such arms and projecting portion having contact-surfaces lying transversely of the ends of the arms in planes angularly related to one another and also having alined openings, a spindle extending through the openings and maintaining the surfaces in engagement, a spindle carried at the outer extremity of the extension, and a support mounted upon this outer spindle.

5. A device adapted for mounting a pasting apparatus upon a machine, comprising a bracket having spaced arms extending substantially horizontally, an extension-arm having an inner end interposed between the bracket-arms, said extension-arm being provided with spaced outer extremities, said bracket and said interposed extension arm having vertically alined openings and opposed non-parallel contact surfaces adjacent to the openings, a spindle passing through the alined openings to separably interlock the extension-arm in place upon the bracket, there also being vertical openings in the outer extremities of the extension-arm, another spindle located in the openings in the outer extremities of the extension-arm, a support arranged to turn about the latter spindle, and means for securing said latter spindle in the extension-arm and the support upon the spindle.

6. A device adapted for mounting a pasting apparatus upon the vertical face of a machine frame comprising a bracket which may be reversibly secured to said vertical face to extend in either of two directions horizontally therefrom, an extension separable from the bracket, a locking spindle, said bracket and extension having opposite symmetrically positioned pairs of contact-faces arranged in planes intersecting one another and the axis of the locking spindle, said spindle intersecting the bracket and extension and arranged to hold them in engagement, and a support for the apparatus movable upon the extension.

7. A device adapted for mounting a pasting apparatus upon an upright surface of a machine frame having threaded holes positioned one above the other, said device comprising a bracket having projecting ribs to contact with said upright surface, spaced screws for removably securing the bracket to the frame so that the bracket may extend in either of two directions, said bracket cooperating loosely with at least one of said screws in either of two positions prior to the tightening of said screws thereby adjustably to secure the bracket in position and to permit in both positions of the bracket a variation in its angle in a vertical plane with respect to the frame, and a support for the apparatus carried by the bracket.

8. A device adapted for mounting a pasting apparatus upon the vertical face of a machine column comprising a reversible bracket having three openings spaced longitudinally of the column with the intermediate opening smaller than its companions, securing screws extending into the column through the intermediate opening and the next lower associated opening, one of said securing screws fitting tightly into the intermediate opening and the other of said securing screws fitting loosely into the lower opening whereby the position of the bracket on the column may be adjusted as it hangs on the upper screw, and a support for the pasting apparatus carried upon the bracket.

9. A mounting device comprising a bracket having spaced arms forming an intermediate recess, flanges upon said arms provided with converging outwardly diverging inclined faces, an extension provided with oppositely inclined faces adapted to be received in and to rest against the inclined faces of the bracket, said extension being provided with a projecting part loosely received in the recess between the spaced arms of the bracket, said bracket and said projecting member being provided with openings arranged to be brought into alinement upon the close contact of the inclined faces of the bracket and the extension, a spindle closely fitting said openings arranged to hold said extension upon the bracket in rigid relation thereto, and a support adjustably secured to said extension.

In testimony whereof I have signed my name to this specification.

JOHN W. COSGROVE.